Nov. 10, 1964   M. HRITZ   3,156,012
VACUUM MOLDING MACHINE
Filed Feb. 27, 1962
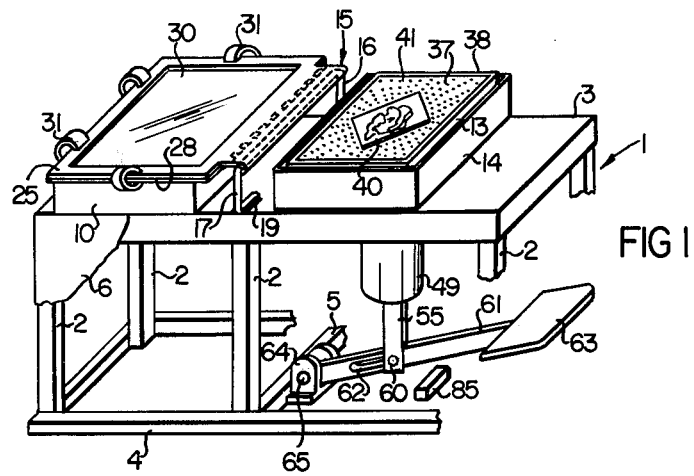
FIG 1
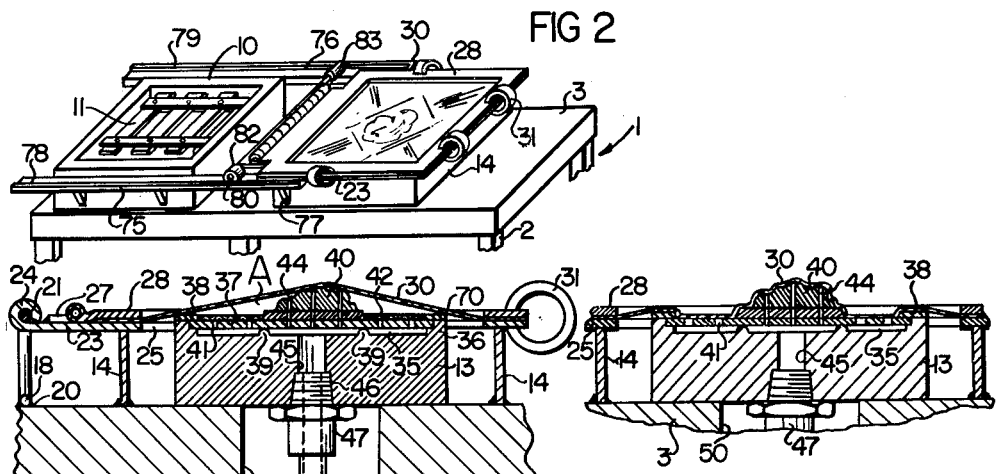
FIG 2
FIG 3
FIG 4
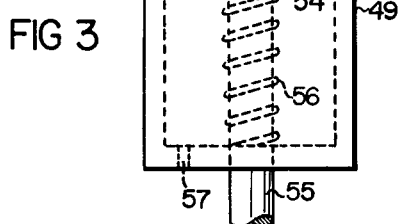
INVENTOR.
MICHAEL HRITZ
BY Oberlin, Maky & Donnelly
ATTORNEYS United States Patent Office 3,156,012
Patented Nov. 10, 1964

3,156,012
VACUUM MOLDING MACHINE
Michael Hritz, 6329 Ridge Road, Parma 29, Ohio
Filed Feb. 27, 1962, Ser. No. 175,929
7 Claims. (Cl. 18—19)

This invention relates generally, as indicated, to a vacuum molding machine and more particularly to a machine and method for quickly and simple drape-forming a thermoplastic sheet material.

Vacuum forming of thermoplastic sheet material is generally widely known but machines and methods employed are generally of such complex nature as to preclude their use in relatively simply operations. Moreover, such machines generally employ motor driven vacuum pumps which have air pressure lines connected to the vacuum chamber with valves for alternately communicating the chamber with the vacuum pump and with air pressure lines. It is impossible then to control accurately the amount of pressure obtained which can be quite critical. In such known machines, the vacuum chambers are quite large in volume requiring excessive work to create the necessary vacuum.

With the present invention, a fixed amount of air is employed in a closed vacuum chamber variable in volume. In this manner, a negative pressure between the pattern or mold and the thermoplastic sheet material can be created simply by enlarging and reducing the volume of the chamber. Moreover, by reducing such chamber to less than its original size, a higher than atmospheric pressure can be obtained between the mold and the sheet to assist in properly stripping the set sheet from the pattern or mold.

Another of the problems encountered in conventional vacuum molding machines is the problem of quickly moving and clamping the heated thermoplastic sheet material to the vacuum box to preclude loss of the molding temperature. With the present invention, it is possible either to swing the frame holding such thermoplastic sheet material about a horizontal axis or shift it bodily horizontally from the heating unit to the vacuum molding box.

It is accordingly a principal object of the present invention to provide a highly simplified drape-forming vacuum molding machine not employing the usual vacuum pumps, valves, etc.

It is another important object to provdie a vacuum molding machine and method employing a fixed amount of air to create the necessary subatmospheric pressure and to create a greater than atmospheric pressure employed to strip the set sheet from the pattern.

It is a further object to provide such machine and method employing a variable volume vacuum chamber to create the aforesaid subatmospheric and greater than atmospheric pressures.

Other objects and advantages of the present invention will become apparent as the folowing description proceeds.

To the accomplishment of the foregoing and related ends, the invention, then, comprises the features hereinafter fully described and particularly pointed out in the claims, the following description and the annexed drawing setting forth in detail certain illustrative embodiments of the invention, these being indicative, however, of but a few of the various ways in which the principle of the invention may be employed.

In said annexed drawing:

FIG. 1 is a fragmentary perspective view partially broken away of a vacuum forming machine in accordance with the present invention;

FIG. 2 is a fragmentary view similar to FIG. 1 showing a further form of the present invention;

FIG. 3 is an enlarged detail medial transverse section of the FIG. 1 embodiment showing the thermoplastic sheet material draped over the pattern; and FIG. 4 is a fragmentary sectional view similar to FIG. 3 showing the sheet material drawn into engagement with the pattern.

Referring now to the drawing and more particularly to FIG. 1, it will be seen that the illustrated machine comprises a stand 1 including a plurality of upstanding legs 2 supporting a table top 3. Rectangular bottom frame 4 may be employed to rigidify the stand, such bottom frame including a transverse cross frame member 5. The stand 1 may be covered with appearance walls indicated generally at 6 which additionaly serve to rigidify the frame and supporting structure for the table top 3.

The table top 3 supports an open top heater box 10 which may preferably have electrical heater elements 11 therein. The interior of the box may be lined with a reflective material so that the heat emanating from the resistor elements therein will be directed upwardly against the thermoplastic sheet material disposed over the top of the box. Also supported on the table top 3 is a vacuum box 13 surrounded by a rectangular frame support 14. In the FIG. 1 embodiment, positioned between the open top heater box 10 and the vacunm box 13 and frame 14, is a pivot bracket 15 having downturned legs 16 and 17 terminating in inwardly turned portions 18 and 19 secured to the top 3 as by the welding indicated at 20. The horizontally extending top portion 21 of the bracket 15 provides a horizontally extending pivot axis for a frame 23. Such frame may be wrapped around the horizontally extending portion 21 of the bracket 15 as indicated at 24 so that the frame may quickly and easily be pivoted about the horizontal axis thus afforded. The frame 23 includes a rectangular portion 25 which corresponds peripherally to the open top heater box 10 and the frame support wall 14 surrounding the vacuum box 13.

A hinge 27 is secured to the top of the frame 23 as shown in FIG. 3, and the underside of the frame as shown in FIG. 1, which pivotally mounts on such frame 23 a further rectangular frame 28 of the same rectangular dimensions as the portion 25 of the frame 23. Between the frame 28 and the portion 25 of the frame 23, a thermoplastic material sheet 30 may be clamped releasably as by the plurality of spring clamps shown at 31.

The vacuum box 13 includes a depressed center portion 35 having upstanding peripheral shouldered side wall portions 36, the shoulders of which peripherally support a plate 37. The peripheral frame 38 may be secured to the top of the upstanding peripheral wall portions 36 to overlie the plate 37. Recessed screws or the like may be employed releasably to secure the frame to the vacuum box to permit ready removal of the plate 37 when desired. The depressed portion 35 may be provided with a plurality of upstanding projections 39 supporting the plate 37 in a horizontal plane. Supported centrally on the plate 37 is a two-piece male pattern or mold 40 which may, for example, be made of wood or other suitable material. The support plate 37 is provided with relatively few large holes which may, for example, be ⅛ inch in diameter as shown at 41. A layer of screen or burlap material 42 may be positioned about the pattern or mold 40 to provide a textured background for the centrally disposed configuration of the pattern or mold 40. It will, of course, be understood that the layer of screen or burlap 42 may be omitted if desired. The pattern or male mold 40 may be provided with a plurality of small holes indicated generally at 44, such holes preferably being substantially smaller than the holes 41 in the support plate 37. Both the holes 41 and 44 communicate with the depressed chamber 35 beneath the support plate 37 which in turn communicates with a vertically extending centrally disposed bore 45 in the vacuum box 13.

The lower end of the bore 45 is tapped as indicated at 46 and a union 47 is inserted therein providing fluid communication between the bore 45 and conduit 48 which leads to the blind end of cylinder 49. An opening 50 in the table top 3 is provided to accommodate the conduit 48 and union 47.

The cylinder 49 may be secured to the underside of the table 3 by an annular support member or spider 52 bolted or otherwise secured to the table as indicated at 53. A piston 54 within the cylinder 49 is mounted on rod 55. A return compression spring 56 surrounds the rod 55 within the cylinder 49 between the rod end of the cylinder and the piston 54. The rod end of the cylinder 49 is vented to atmosphere as indicated at 57. The lower end of the rod 55 may be split and pin-connected as indicated at 60 to an operating arm 61 through elongated slot 62 therein. Such operating arm may be provided at its distal end with a treadle 63 and may be pivoted at its proximal end to a bracket 64 as indicated at 65. (Note FIG. 1.) It can now be seen that the compression spring 56 will maintain the piston 54 in its uppermost position and also, accordingly, the rod 55, the operating arm 61, and the treadle 63.

In operation of the FIG. 1 embodiment, a sheet of thermoplastic material 30 is clamped between the frames 28 and 25 as by the spring clamps 31 and pivoted about the horizontal axis of the bracket 15 to be positioned over the heater elements inside the box 10. In this juxtaposition of the heater and work, the thermoplastic material sheet 30 will be heated to a molding temperature. In many thermoplastics, the heated sheet first sags and distorts and when the proper molding temperature is reached, the sheet becomes oriented and stretches tight. In this manner, complex thermostats and controls need not be employed since a visual indication will be afforded as to when the sheet has reached its molding temperature. The frames may then quickly be pivoted in a clockwise direction as seen in FIG. 1 to position the frame on the upstanding walls of the frame support 14 in the FIG. 3 position. The heated sheet 30 will then be draped or stretched over the upstanding male mold or pattern 40 and a peripheral seal will be afforded between the frame 38 surrounding the vacuum box and the sheet as indicated at 70. The heated workpiece is then in position for the vacuum forming operation. When the frame and workpiece are thus properly positioned, the operator need only depress the treadle 63 to cause the piston 54 to move downwardly within the cylinder 49 to enlarge the volume of the vacuum chamber to create a subatmospheric pressure between the pattern comprised of the male mold 40 and the support plate 37 and the sheet 30. This will cause the heated sheet to conform to the male mold 40 and plate 37 due to the atmospheric pressure on the top thereof as indicated in FIG. 4. The sheet will then be held in this position with the treadle depressed until the same has cooled to set in the proper molded condition. When the sheet has set or cooled sufficiently, the treadle 63 will be released and the spring 56 will cause the piston 54 to move to the top of the cylinder 49 raising the pressure in the vacuum chamber from subatmospheric to greater than atmospheric and this greater than atmospheric pressure will expel or strip the sheet from the mold and support plate. If the molded sheet is in any way defective, it may be kept within the frame and pivoted back to a position over the heater box for reheating and then molded again in the same manner. When reheated, the sheet will resume its original flatness.

It is apparent that the vacuum chamber will comprise the air space between the thermoplastic sheet 30 and the pattern indicated generally at A in FIG. 3, the relatively thin chamber 35 beneath the plate 37 and the base of the vacuum box, and conduit 48 leading from the blind end of cylinder 49 to the chamber 35. In the illustrated embodiment, the chamber 35 may preferably be quite shallow such as, for example, 1/32 of an inch deep. When the piston 54 is moved downwardly, the volume of the cylinder above the piston is then added to the vacuum chamber and such chamber is then substantially enlarged creating the subatmospheric pressure beneath the sheet 30 required to cause the atmospheric pressure to press firmly the thermoplastic heated sheet against the plate and mold.

It also becomes apparent that after the thermoplastic sheet 30 has cooled and set in the position shown in FIG. 4, the air space A is no longer a part of the vacuum chamber. Accordingly, when the piston 54 is returned to its original position by the pressure of spring 56, a greater than atmospheric pressure will be produced in the vacuum chamber and this will tend to blow or push the set sheet away from the mold and plate causing the effective stripping of the work from the mold. Accordingly, it is possible to use more complex molds and with the proper arrangement of the perforations in the plate and mold, locking of the set sheet to the mold can effectively be prevented. Thus there is provided a machine and method for performing drape-vacuum molding employing a simple closed variable volume fluid chamber which can be enlarged by the movement of the piston 54 to draw the sheet into conformity with the pattern or mold, and after the sheet has set, by returning the piston to its original position, the volume of the vacuum chamber is then reduced to less than its original size properly to expel or strip the sheet from the pattern. When the thus formed sheet has been properly set and stripped from the mold, it can quickly be removed from the clamping frames 25 and 28 and trimmed peripherally to any desired size.

In the embodiment shown in FIG. 2, the table 3 and support stand 1 may be identical in form to that shown in the FIG. 1 embodiment. Also the heating box 10 and the frame support 14 and vacuum box 13 may be substantially identical in form to the FIG. 1 embodiment. However, in this embodimnet, instead of providing a central pivot bracket 15 for the support frame for the thermoplastic sheet, the frame members 23 and 28 may be mounted for horizontal bodily reciprocation on rails 75 and 76 supported on the walls of the heater box 10 and frame 14 by brackets or the like shown at 77. Such rails 75 and 76 may be provided with outside upstanding shoulders 78 and 79 confining the frames 23 and 28 against lateral movement and a shaft 80 will be secured to the frame 23 in much the same manner as the upper portion 21 of the bracket 15 is secured to the frame 23 in the FIG. 3 embodiment of the invention. Rollers 82 and 83 may be provided on the outer ends of the shaft supporting the frames 23 and 28 for such horizontal bodily reciprocation. It can also be seen that the employment of the horizontally extending rails 75 and 76 does not also preclude the swinging of the frames about the horizontal pivot of the rollers 82 and 83 to swing the heated plastic from the heater to the vacuum box in much the same manner as in the FIG. 1 embodiment. In any event and in either embodiment, the heated plastic sheet can quickly and easily be transferred from the source of heat to be peripherally sealed to the vacuum box for the subsequent forming operation.

The amount of subatmospheric pressure obtained in the vacuum chamber is, of course a factor of the extent of movement of the rod 55 and the piston 54. This can readily be controlled by suitable stops to limit the downward movement of the piston and rod. One such stop is shown in FIG. 1 wherein a chock 85 may be positioned on the floor supporting the stand beneath the operating arm 61. The stop 85 may then only be adjusted longitudinally of the arm 61 to control the extent of downward movement of the rod and piston. Many other suitable stops may equally well be employed.

A wide range of thermoplastic sheet materials may be employed with the present invention and among those that can readily be used are the following:

Acetyl polymers and copolymers;
Acrylics including methyl methacrylate and modified acrylic molding compounds;
Cellulosic molding compounds and sheets including ethyl cellulose, cellulose acetate, cellulose propionate, cellulose acetate butyrate, cellulose nitrate (pyroxylin);
Chlorinated polyether;
Nylon molding compounds;
Polyethylene;
Polypropylene;
Polychlorotrifluoroethylene;
Fluorocarbons;
Polystyrenes;
Special styrenes, such as glass fiber filled styrenes;
Vinyl butyral compounds;
Vinyl chloride and vinyl chloride-acetate compounds;
Vinylidene chloride;
Polyvinylidene fluoride; and
Urethane elastomers.

Also, certain mono or biaxially oriented thermoplastic sheets may be employed with certain types of male molds.

It can now be seen that there is provided a simplified machine and method for quickly and conveniently drape-forming by vacuum molding a thermoplastic sheet material wherein the closed variable volume vacuum chamber may be enlarged to create the necessary vacuum and then reduced to less than its original size to create a greater than atmospheric pressure to expel the set sheet from the mold.

Other modes of applying the principle of the invention may be employed, change being made as regards the details described, provided the features stated in any of the following claims or the equivalent of such be employed.

I, therefore, particularly point out and distinctly claim as my invention:

1. A vacuum molding machine comprising a vacuum box, a perforated pattern in such vacuum box, a heating means horizontally spaced from such vacuum box, frame clamping means for clamping a sheet of thermoplastic material, said frame clamping means being mounted on a pivot bracket between said heating means and said vacuum box for swinging said frame clamping means and thus said sheet of thermoplastic material about a horizontal axis from a position adjacent said heating means to a position adjacent said vacuum box and in peripheral sealing engagement therewith, a closed variable volume vacuum chamber in fluid communication with said perforated pattern, means to enlarge the volume of said vacuum chamber to create a less than atmospheric pressure between said sheet and pattern to cause such sheet to conform to such pattern, and means to reduce said vacuum chamber to less than its original size to create a greater than atmospheric pressure to expel said sheet from said pattern.

2. The vacuum molding machine of claim 1 wherein said vacuum chamber includes a piston-cylinder assembly, said means to enlarge the volume of said vacuum chamber comprises a treadle operative to move said piston within said cylinder, and said means to reduce the size of said vacuum chamber comprises a compression spring acting on said piston within said cylinder.

3. A vacuum molding machine comprising a support member, a heating means on said support member, a vacuum box on said support member adjacent said heating means, frame clamping means for clamping a sheet of thermoplastic material, means pivotally mounting said clamping means on a horizontal axis extending between said heating means and said vacuum box whereby said frame may be swung about such horizontal axis to position said sheet of thermoplastic material adjacent said vacuum box and in sealing engagement therewith after said sheet of thermoplastic material has been heated adjacent said heating means, and means for creating a vacuum in said vacuum box to cause said heated sheet of thermoplastic material to conform to a pattern therewithin.

4. A vacuum molding machine comprising a table, a heating means on said table, a vacuum box on said table adjacent said heating means, frame clamp means adapted to clamp a sheet of thermoplastic material therebetween, means pivotally mounting said clamp means on a horizontal axis extending between said heating means and said vacuum box whereby said frame may be swung about such horizontal axis to position said sheet of thermoplastic material adjacent said vacuum box and in peripheral sealing engagement therewith after said sheet of thermoplastic material has been heated adjacent said heating means, and means to enlarge the volume of a vacuum chamber within said vacuum box to cause said heated sheet of thermoplastic material to conform to a perforated pattern therewithin.

5. A vacuum molding machine comprising a vacuum box, a perforated pattern in said vacuum box, a heating means spaced from said vacuum box, frame clamping means for clamping a sheet of thermoplastic material, said frame clamping means having rollers secured to one end thereof, said rollers being mounted on horizontally extending rails for horizontal bodily shifting movement of sad frame means between said heating means and said vacuum box, said frame means being mounted to pivot about the axis of said rollers whereby said frame means and thus said thermoplastic material may be pivoted upwardly during such horizontal movement of said frame means toward said vacuum box and pivoted downwardly into peripheral sealing engagement with said vacuum box after said frame means is disposed adjacent said vacuum box.

6. A vacuum holding machine comprising a support member, a vacuum box mounted on said support member, a pattern in said vacuum box, a heating means mounted on said support member spaced from said vacuum box, frame clamping means for clamping a sheet of thermoplastic material, means pivotally mounting said frame clamping means on said support member between said heating means and said vacuum box for swingng movement of said frame clamping means and thus said sheet from a position adjacent said heating means to a position adjacent said vacuum box and in peripheral sealing engagement therewith, and means for creating a vacuum in said vacuum box to cause said heated sheet to conform to said pattern.

7. A vacuum molding machine comprising a horizontally disposed support member, a heating means on said support member, a vacuum box on said support member adjacent said heating means, frame clamping means for clamping a sheet of thermoplastic material, means pivotally mounting said frame clamping means on a horizontal axis extending between said heating means and said vacuum box for upward swinging movement of said frame clamping means and thus said sheet from a position adjacent and above said heating means to a position above said vacuum box and in peripheral sealing engagement therewith, and means for creating a vacuum in said vacuum box to cause said heated sheet of thermoplastic material to conform to a pattern therewithin.

References Cited by the Examiner

UNITED STATES PATENTS

| | | | |
|---|---|---|---|
| 2,974,366 | 3/61 | Bauman | 18—19 XR |
| 2,976,658 | 3/61 | Kostur | 53—112 |
| 2,989,780 | 6/61 | Zimmerman | 18—19 XR |
| 3,019,488 | 2/62 | Doyle et al. | 18—56 |

FOREIGN PATENTS

| | | |
|---|---|---|
| 1,158,122 | 1/58 | France. |
| 150,396 | 4/04 | Germany. |
| 1,091,316 | 10/60 | Germany. |
| 867,928 | 5/61 | Great Britain. |

References Cited by the Applicant

UNITED STATES PATENTS

| | | |
|---|---|---|
| 286,693 | 10/93 | Fried. |
| 1,737,874 | 12/29 | Busch. |
| 2,442,338 | 6/48 | Borkland. |
| 2,493,439 | 1/50 | Braund. |
| 2,694,227 | 11/54 | Fordyce et al. |
| 2,700,179 | 1/55 | Benson. |
| 2,702,411 | 2/55 | Winstead. |
| 2,814,077 | 11/57 | Moncrieff. |
| 2,926,385 | 3/60 | Willson. |
| 2,973,558 | 3/61 | Stratton. |

MICHAEL V. BRINDISI, *Primary Examiner.*

WILLIAM J. STEPHENSON, ALEXANDER H. BRODMERKEL, MORRIS LIEBMAN, *Examiners.*